United States Patent [19]

Epstein

[11] 4,107,852

[45] Aug. 22, 1978

[54] MEMORIZATION AIDS

[76] Inventor: Robert D. Epstein, 7 Tanglewood Rd., West Hartford, Conn. 06117

[21] Appl. No.: 756,621

[22] Filed: Jan. 4, 1977

[51] Int. Cl.² .......................................... G09B 19/00
[52] U.S. Cl. ..................................... 35/8 R; 35/35 B
[58] Field of Search ............... 35/35 R, 35 B, 66, 8 R; 40/106.52, 106.53

[56] References Cited
U.S. PATENT DOCUMENTS

| 2,840,925 | 7/1958 | Dunson | 35/35 B |
| 3,135,059 | 6/1964 | Barish | 35/66 |
| 3,437,401 | 4/1969 | Siksai | 40/106.52 X |

Primary Examiner—William H. Grieb

[57] ABSTRACT

The present device allows for continuous control of the saliency of textual material by the person attempting to memorize said material. A preferred embodiment of the device described herein consists primarily of two linear polarizers, a housing for the polarizers, and a lever. The polarizers are mounted parallel to one another in the housing such that the textual material can be viewed through said polarizers when said material is placed behind the device, and such that one of the polarizers can be rotated with respect to the other polarizer through a ninety degree angle by use of the lever such that the amount of light transmitted through the polarizers will vary continuously from some maximum value to some minimum value. To memorize certain textual material, one places the device over said material, rereading said material while progressively moving the lever such that light transmission through the polarizers varies from the maximum value to the minimum value.

3 Claims, 1 Drawing Figure

MEMORIZATION AIDS

BACKGROUND OF THE INVENTION

The present invention relates to devices and methods that aid in memorization, and more generally to teaching aids using optical means or masking devices.

Various so-called memorization aids are available that allow for only an all-or-none look at the textual material to be memorized; that is, either the material is fully visible or completely covered, but no intermediate values of the material are obtainable. An all-or-none device offers little advantage over simply covering and uncovering the textual material with one's hand. The present invention, however, facilitates the memorization process in a manner that cannot naturally be accomplished. It allows the user to gradually fade the textual material away as he rereads the material. This procedure makes the task of memorizing more efficient, more pleasurable, and less haphazard than conventional methods, by taking advantage of the fact that as one becomes progressively more skillful at reading certain textual material, one requires progressively less signal to read it.

Other so-called memorization aids require some special preparation of the textual material to be memorized. Contrarily, the present device can be used with almost any textual material without the need to prepare or change that material in any way. Furthermore, the present device is easy to use, and both its operation and its function are easy to comprehend. A preferred embodiment of the device described herein is inexpensive and simple to construct, assuring its practical value.

BRIEF SUMMARY OF THE INVENTION

The purpose of the present apparatus and its method of use is to aid human beings in the memorization of textual material, such as poems, formuli, vocabulary words, or prose. A brief description of a preferred embodiment of the device is substantially set forth in the abstract above. In said embodiment, two crossed polarizers, one of which may be rotated with respect to the other, allow the user to control the saliency of the textual material that he is attempting to memorize. Said embodiment and its method of use will be described in detail hereinafter.

DETAILED DESCRIPTION OF A PREFERRED EMBODIMENT

Figure 1:
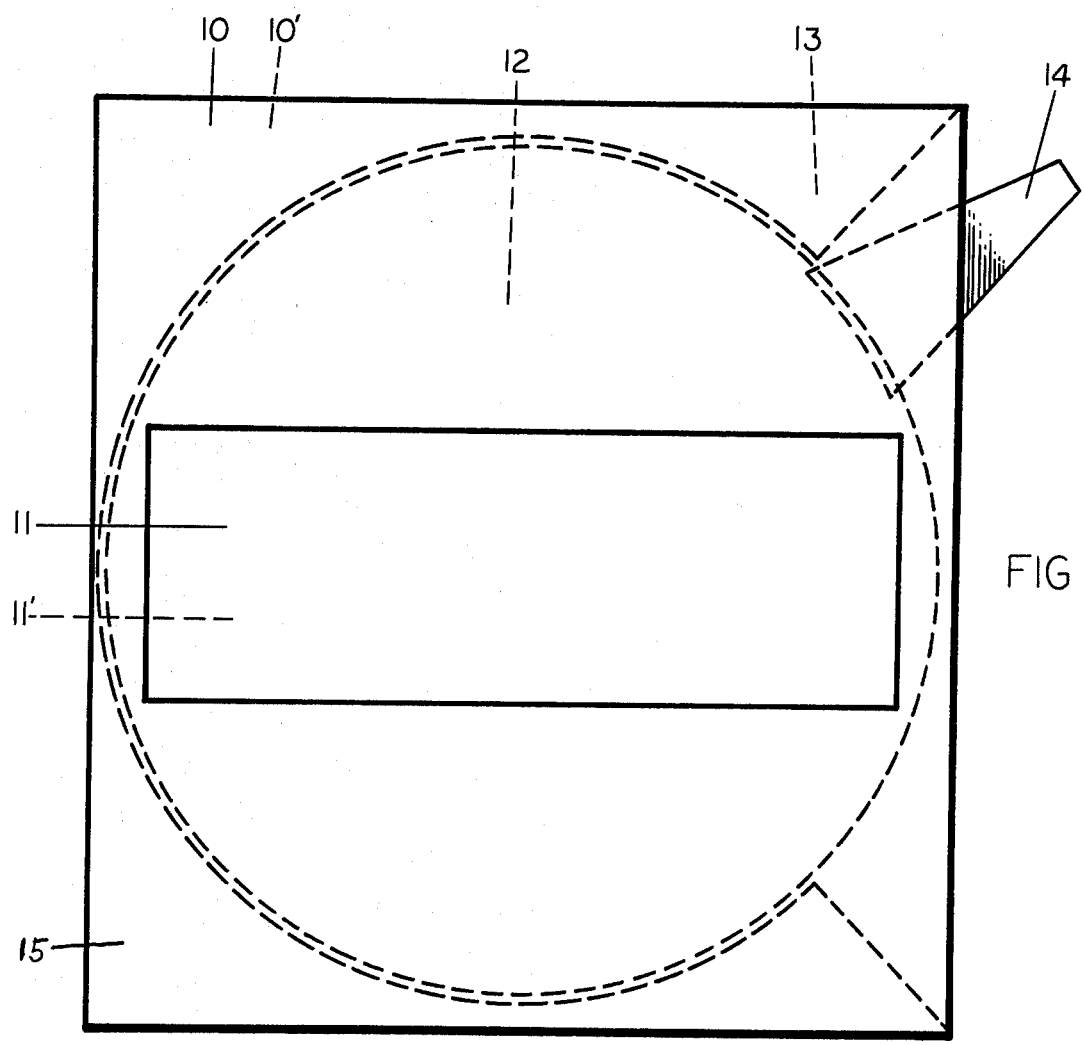
FIG. 1 is a plan view of a preferred embodiment of the present apparatus as seen from the front of the device as it rests in the position in which it would normally be used, as set forth below. Broken lines demark edges of parts that lie below the front surface of the device. The names of the various elements of the device that correspond to the number of labels in the FIGURE are as follows:
  10 top plate member
  10' bottom plate member
  11 top window opening
  11' bottom window opening
  12 moveable linear polarizer
  13 frame for moveable linear polarizer 12
  14 lever
  15 fixed linear polarizer

While this invention is susceptible of embodiment in many different forms, there is shown in the drawing and will hereinafter be described a specific embodiment therefor, with the understanding that the present disclosure is to be considered an exemplification of the principles of the invention and is not intended to limit the invention to the embodiment illustrated.

The device consists primarily of two linear polarizers, a housing for the polarizers, and a lever. Specifically, a flat, rectangular or square plate member 10 made of a rigid plastic material (or plywood, sheet metal, or other suitable material) has a window opening 11 cut therein, approximately centered, as shown. The exact size and shape of this window opening could vary considerably. A bottom plate member 10', identical to the top plate member 10, is located under the plate 10, and has a window opening 11' therein coinciding with the window opening 11 of the top plate 10. In between the top plate 10 and the bottom plate 10' are a fixed and a moveable linear polarizer. The fixed linear polarizer 15 is cut so that it is identical in size to the top plate member 10; this polarizer is mounted immediately behind the top plate 10, so that a portion of the surface of the polarizer fills the window opening 11 cut into plate 10. The upper surface of this fixed polarizer 15 may be optionally coated with a matte or other transparent or translucent non-glare material. Mounted behind the fixed polarizer is a moveable linear polarizer 12, cut in the shape of a circle with a diameter slightly less than either the length or width of the plate member 10, whichever is smaller. The moveable linear polarizer 12 is bounded by a frame 13 as shown, which allows the polarizer 12 to rotate freely. The frame 13 is slightly thicker than the polarizer 12, and is attached on its upper surface to the fixed linear polarizer that is attached to the top plate member 10. The back side of frame 13 is attached to the bottom plate 10', but the bottom plate 10' is not attached to the back side of the moveable polarizer 12, allowing the polarizer 12 to rotate within frame 13. Frame 13 is made of a rigid plastic material or other suitable material, as is the top plate 10 and as is the bottom plate 10'. To one edge of the moveable polarizer 12 is attached a lever 14, as shown. Lever 14 is made of a rigid plastic or other suitable material, approximately the same thickness as frame 13, and protruding as shown from the cutaway side of frame 13. The cutaway side of frame 13 allows the lever 14 to be moved from a position just short of the upper right hand corner of the device as herein embodied to a final position just short of the lower right hand side of the device. It is stopped from moving past the upper and lower right hand corners by the frame 13. In moving the lever 14 from the initial (upper right) to the final (lower right) position, one is rotating the moveable linear polarizer 12 approximately ninety degrees with respect to the fixed polarizer mounted behind plate 10. The two linear polarizers are positioned initially so that their axes are parallel when the lever 14 is in the initial position, and so that their axes are perpendicular when lever 14 is in the final position. With their axes parallel, the polarizers will transmit the maximum amount possible, according to their light transmitting characteristics; with their axes perpendicular, they will transmit the minimum amount of light possible. Progressively rotating one against the other allows less and less light to be transmitted, that amount changing in a non-linear, though continuous fashion from the axes-parallel to the axes-perpendicular position. In the preferred embodiment of the present device, the two linear polarizers have transmission characteristics such that they transmit approximately forty percent of the light in the visible spectrum when in the axes-parallel position, and less than three percent of light in the visible spectrum when in the axes-perpendicular position.

The device desribed above could be enhanced in a number ways depending on its application; for example, it could be enhanced such that the surfaces of the moveable linear polarizer are protected from abuse as might occur from their contact with other surfaces of the device, as through the addition of spacers on either side of the frame of said polarizer. Furthermore, the exposed surfaces of the linear polarizers could be protected from abuse as might occur from their contact with objects external to the device, as through the addition of sheets of clear plastic, glass, or other suitable material, in between the top or bottom plate members and the respective polarizers or on the outer surfaces of the top and bottom plate members.

DESCRIPTION OF A METHOD OF USE OF THE PREFERRED EMBODIMENT

One first places the device against the textual material that is to be memorized, so that the portion to be memorized shows through the window 11—11' when the lever 14 is in the initial position. One then reads through the material to be memorized. One then moves the lever 14 part way towards the final position, so that the screen (window 11—11') darkens slightly, partially obscuring the textual material beneath, and one rereads the textual material. One repeats this procedure until the textual material can be "read" when the lever 14 is in the final position, at which point the window 11—11' has completely obscured the textual material; the textual material is memorized at this point. If one is unable to read through the material at some point, he moves the lever 14 back somewhat towards the initial position, to a point at which the material can be read smoothly, and then continues following the procedure described above.

The foregoing detailed description of a preferred embodiment and its method of use has been given for clearness of understanding only, and no unnecessary limitations should be understood therefrom.

What is claimed is:

1. A memorization device that is manually operable, comprising: a top plate member with an opening cut therein; two linear polarizers comprising a first linear polarizer fixed beneath said plate member such that it obstructs said opening and a second linear polarizer which is circular in form; and a frame for said second polarizer such that the frame is fixed beneath the first plate member and such that said second polarizer is free to rotate within that frame and such that said polarizer obstructs the opening cut in the top plate member; a bottom plate member fixed beneath the frame of the second linear polarizer, said plate member having an opening cut therein that coincides with the opening in the top plate member; a means for rotating the second linear polarizer through at least a ninety degree angle with respect to the first linear polarizer comprising a lever attached to the second linear polarizer and protruding from a cutaway section of the frame of the second linear polarizer.

2. A device as described in claim 1 such that the upper surface of the polarizer which is exposed to the view of the person using the device is coated with or otherwise shielded by a matte or other non-glare transparent or translucent material.

3. A method for the memorization of textual material utilizing a device comprising two linear polarizers such that said polarizers are arranged parallel to one another in the housing and such that said textual material can be viewed through said two polarizers when said textual material is placed behind the device, and a means for rotating one of said two polarizers, the first polarizer, through a ninety degree angle with respect to the other polarizer, said method comprising first reading said textual material while said two polarizers are in their axes-parallel position, thereby allowing maximum light transmission through said two polarizers, then rotating said first polarizer several degrees and rereading said textual material, and then performing this last step repeatedly, thereby progressively and continuously fading or obfuscating said textual material as said two polarizers are moved closer to their axes-perpendicular position, said method also comprising moving said first polarizer such that said two polarizers are moved in a direction from their axes-perpendicular position toward their axes-parallel position when said textual material can no longer be read smoothly, thereby temporarily restoring said textual material to greater visibility, the final step in said method having been reached when said textual material can be recited when said textual material is no longer visible.

* * * * *

UNITED STATES PATENT AND TRADEMARK OFFICE
CERTIFICATE OF CORRECTION

PATENT NO. : 4,107,852
DATED : August 22, 1978
INVENTOR(S) : Robert D. Epstein

It is certified that error appears in the above-identified patent and that said Letters Patent are hereby corrected as shown below:

On the cover sheet, Item [54] should read:
--- Memorization Aid And Method ---.

Signed and Sealed this

Fifth Day of June 1979

[SEAL]

Attest:

RUTH C. MASON
*Attesting Officer*

DONALD W. BANNER
*Commissioner of Patents and Trademarks*